(12) United States Patent
Dudek et al.

(10) Patent No.: US 11,008,169 B2
(45) Date of Patent: May 18, 2021

(54) DRIVING DEVICE FOR A ROLLER CONVEYOR

(71) Applicant: INTERROLL HOLDING AG, Sant' Antonino (CH)

(72) Inventors: Siegmund Dudek, Sant'Antonino (CH); Jonas Steffen, Sant'Antonino (CH); Xavier Frangeul, Sant'Antonino (CH); Antoine Loizeau, Sant'Antonino (CH)

(73) Assignee: INTERROLL HOLDING AG

( * ) Notice: Subject to any disclaimer, the term of this patent is extended or adjusted under 35 U.S.C. 154(b) by 0 days.

(21) Appl. No.: 16/298,185

(22) Filed: Mar. 11, 2019

(65) Prior Publication Data
US 2019/0276238 A1    Sep. 12, 2019

(30) Foreign Application Priority Data
Mar. 12, 2018    (EP) .................................... 18161255

(51) Int. Cl.
| | | |
|---|---|---|
| *B65G 13/07* | (2006.01) | |
| *B65G 13/06* | (2006.01) | |
| *B65G 13/071* | (2006.01) | |
| *B65G 21/00* | (2006.01) | |
| *B65G 13/00* | (2006.01) | |

(52) U.S. Cl.
CPC .......... *B65G 13/06* (2013.01); *B65G 13/071* (2013.01); *B65G 13/00* (2013.01); *B65G 21/00* (2013.01)

(58) Field of Classification Search
CPC ....... B65G 13/06; B65G 13/07; B65G 13/071
USPC ......................................... 198/789, 790, 312
See application file for complete search history.

(56) References Cited

U.S. PATENT DOCUMENTS

| | | | | |
|---|---|---|---|---|
| 2,870,922 A | * | 1/1959 | Thomson .............. | B65G 57/06 414/792 |
| 3,075,659 A | | 1/1963 | Sylvester et al. | |
| 4,117,923 A | * | 10/1978 | Werntz .................. | B65G 47/26 198/790 |
| 4,279,337 A | * | 7/1981 | Kachnik .............. | B65G 35/06 104/165 |
| 4,508,484 A | | 4/1985 | Heiz | |

(Continued)

FOREIGN PATENT DOCUMENTS

| | | |
|---|---|---|
| DE | 102008053557 | 9/2009 |
| EP | 0 100 867 | 2/1984 |

(Continued)

OTHER PUBLICATIONS

US 2008/0121011 A1, Petratto, May 29, 2008.*
US 2015/0041284 A1, Pfeiffer et al., Feb. 12, 2015.*

*Primary Examiner* — Douglas A Hess
(74) *Attorney, Agent, or Firm* — Price Heneveld LLP

(57) ABSTRACT

A mobile driving device for driving a roller conveyor includes a chassis frame, a traction device mounted to the chassis frame, wherein the traction device is adapted to move the chassis frame on a supporting surface, a first drive unit mechanically coupled to the traction device to transmit a driving force to the traction device for moving the chassis frame on the supporting surface, a roller driving device mounted to the chassis frame, wherein the roller driving device is adapted to be mechanically coupled to one or a plurality of rollers of the roller conveyor, and a second drive unit mechanically coupled to the roller driving device for transmitting a conveying force to the roller driving device.

28 Claims, 9 Drawing Sheets

(56) References Cited

U.S. PATENT DOCUMENTS

| | | | | |
|---|---|---|---|---|
| 4,620,629 | A | * | 11/1986 | Dean .................... B65G 41/002 198/836.1 |
| 4,863,012 | A | * | 9/1989 | Nord .................... B65G 47/261 198/781.09 |
| 5,007,526 | A | * | 4/1991 | Fazzina ................. B65G 13/071 198/787 |
| 5,016,748 | A | * | 5/1991 | Garzelloni ........... B65G 47/261 198/781.09 |
| 5,636,727 | A | * | 6/1997 | Neri .................... B65G 1/0485 198/463.3 |
| 6,633,278 | B1 | | 10/2003 | Hoegener et al. |
| 6,701,214 | B1 | | 3/2004 | Wielebski et al. |
| 7,077,615 | B2 | * | 7/2006 | Thogersen ................ B64F 1/32 198/301 |
| 7,503,451 | B2 | * | 3/2009 | Hirasawa ................. B65G 13/04 198/369.1 |
| 7,584,834 | B2 | * | 9/2009 | Wood .................... B65G 37/00 198/312 |
| 7,641,043 | B2 | * | 1/2010 | Vestergaard ............. B64D 9/00 193/35 R |
| 8,196,736 | B2 | * | 6/2012 | Wagner ................. B65G 13/04 198/457.02 |
| 9,573,765 | B2 | * | 2/2017 | Becker ................... B65G 15/28 |
| 10,011,434 | B1 | * | 7/2018 | Messina ................ B65G 41/005 |
| 10,370,203 | B2 | * | 8/2019 | Enenkel ................. B64F 1/32 |
| 2002/0010527 | A1 | | 1/2002 | Wielebsi et al. |
| 2004/0144623 | A1 | | 7/2004 | Newsom et al. |
| 2006/0293782 | A1 | | 12/2006 | Rees |
| 2008/0181753 | A1 | | 7/2008 | Bastian et al. |
| 2012/0175225 | A1 | | 7/2012 | Breen et al. |
| 2015/0151921 | A1 | | 6/2015 | Collot |
| 2016/0080526 | A1 | | 3/2016 | Meyer-Graefe |
| 2016/0167888 | A1 | | 6/2016 | Anthony |
| 2016/0318714 | A1 | | 11/2016 | Reischl |

FOREIGN PATENT DOCUMENTS

| | | |
|---|---|---|
| EP | 2455310 | 5/2012 |
| EP | 3090966 | 11/2016 |
| FR | 2 779 133 | 12/1999 |
| JP | S63123707 | 5/1988 |
| JP | H08268538 | 10/1996 |
| JP | 1999-036647 | 2/1999 |
| JP | 2003026603 | 1/2003 |
| JP | 2003104534 | 4/2003 |
| JP | 2004098554 | 4/2004 |
| JP | 2014516895 | 7/2014 |
| JP | 2014142740 | 8/2014 |
| JP | 2015020842 | 2/2015 |
| WO | 0203153 | 1/2002 |
| WO | 2012113922 | 8/2012 |
| WO | 2012154650 | 11/2012 |
| WO | 2014118716 | 8/2014 |
| WO | 2014178399 | 2/2017 |
| WO | 2018038171 | 3/2018 |

* cited by examiner

DRIVING DEVICE FOR A ROLLER CONVEYOR

CROSS-REFERENCE TO FOREIGN PRIORITY APPLICATION

The present application claims the benefit under 35 U.S.C. §§ 119(b), 119(e), 120, and/or 365(c) of EP 18161255.7 filed Mar. 12, 2018.

FIELD OF THE INVENTION

The invention relates to a driving device for driving a roller conveyor. According to a further aspect, the invention relates to a method for driving a roller conveyor.

BACKGROUND OF THE INVENTION

Roller conveyors are used in intralogistic applications for transporting goods along a pre-determined path. Typically, such roller conveyor may be used to convey any such goods directly, or to convey pallets, boxes or the like containing such goods.

A usual setup of a roller conveyor comprises a plurality of rollers being rotatably mounted in a frame. The axes of rotation of the rollers may be parallel to each other to setup a roller conveyor for a straight conveying direction. For a setup having a curved conveying direction, the axes of rotation of the rollers may be angular to each other and the rollers employed in such a curved path may have a conical shape.

A main advantage of such roller conveyors is the option to control the conveying action of a plurality of goods on said roller conveyor individually for each good to be conveyed and selectively for single rollers or groups of rollers. Usually, a roller conveyor is divided up into a plurality of conveyor zones and each conveyor zone may be driven individually to effect a conveying of goods placed in said zone and to convey said goods into an adjacent downstream zone. For example, a roller conveyor may be controlled to convey a plurality of goods in a block mode, wherein all goods in all conveyor zones are conveyed simultaneously or in a single mode wherein a single good or goods in a single conveyor zone is/are conveyed from one zone to the adjacent downstream zone only if the adjacent downstream zone is empty.

The individual and selective control of the conveying action in a roller conveyor requires a plurality of drive units to allow the individual control. Usually, a single conveyor zone comprises a single motor driven roller and a plurality of idle rollers. The single motor driven roller is employed for effecting the conveying action. To this regard, the motor driven roller itself effects a conveying action via its circumferential surface, namely the outer roller body. Further, the motor driven roller may drive the adjacent idle rollers of the conveyor zone by, e.g., a belt transmission arrangement at one end of the rollers.

In other embodiments, a motor is installed at each conveyor zone below a plurality of idle rollers to drive said idle rollers via a chain drive, belt drive, or the like from below. Generally this type of roller conveyor allows for effective conveying of goods such that multiple goods can be conveyed with high conveyor speed on such roller conveyors. However, the need for individual control and driving action of the multiple conveyor zones employed in such roller conveyor requires a significant number of drive units, control units and programming action to effect said conveying action. Further, whilst it is possible to design and setup such roller conveyors depending on the expected volume of goods to be conveyed therewith, it is generally not possible to adapt such roller conveyors in case of a change of such volume of goods without the need to reconfigure the roller conveyor and to thus interrupt the conveying action for a significant time. As a result herefrom, roller conveyors are usually designed to fulfil the expected maximum volume of goods to be conveyed. Much often, thus, the roller conveyors are driven over long time periods in a condition where only a small percentage of the capacity is used.

It is a general desire and the object of the invention to allow a fast change of the setup of a roller conveyor such as to allow efficient conveying of small or large volumes of goods.

SUMMARY OF THE INVENTION

This object is solved by a mobile driving device for driving a roller conveyor comprising a chassis frame, a traction device mounted to said chassis frame, wherein said traction device is adapted to move said chassis frame on a supporting surface, a first drive unit mechanically coupled to said traction device to transmit a driving force to said traction device for moving said chassis frame on said supporting surface, a roller driving device mounted to said chassis frame, wherein said roller driving device is adapted to be mechanically coupled to one or a plurality of rollers of said roller conveyor, and a second drive unit mechanically coupled to said roller driving device for transmitting a conveying force to said roller driving device.

According to the invention, a mobile driving device is provided which is adapted for driving a roller conveyor. As a first important aspect of the invention, the driving device employed for driving the rollers of a roller conveyor is mobile, such that the driving device can be moved relative to the roller conveyor and be positioned at different places at the roller conveyor. By this, the driving action effected by the driving device onto the rollers of the roller conveyor can be provided at different positions and thus can drive different rollers of the roller conveyor.

To effect the mobility of the mobile driving device, it is built up from a chassis frame and a traction device mounted to said chassis frame. The chassis frame may be a platform, framework, or the like and the traction device may be any type of mechanical arrangement allowing to move said chassis frame from one place to another. Generally, the traction device may comprise wheels, rollers, a caterpillar, or the like, which may at the same time support the chassis frame on supporting surface like, e.g., a ground surface, a guiding frame or rails, or the like, and can transmit a driving force from said chassis frame to a counterface like, e.g., onto the supporting surface to propel the mobile driving device over said supporting surface. However, other variations of a traction device may comprise a device interacting with the roller conveyor, e.g., with its frame or framework or any other installations in the vicinity of such a roller conveyor to drive the mobile driving device from one place to the other along the roller conveyor or between two different roller conveyors. It is generally understood that the traction device may have a limited degree of freedom to drive the chassis frame along a part of the roller conveyor only or may have full degree of freedom to drive the chassis frame to any position within a huge roller conveyor arrangement or even to drive the chassis frame from one roller conveyor to another roller conveyor. While basically the chassis frame may be supported on a ground surface, in other variations, the chassis frame may be supported in a framework, in any other type of mechanical construction constituting the supporting surface and thus move over said ground surface in a distance from said ground surface.

The mobile driving device further comprises a first drive unit for driving said traction device. By this, the mobile driving device is self-propelled and thus can move independently from one position to another position by said traction device. The first drive unit may, e.g., be an electric motor and may serve for other purposes than only driving said chassis frame via said traction device only. For example, the electric motor may serve to drive the rollers of the roller conveyor as well.

The mobile driving device according to the invention further comprises a roller driving device. This roller driving device allows a mechanical coupling to a single roller or to a plurality of rollers of a roller conveyor simultaneously and it is understood that depending on the position of the chassis frame, another single roller, or a plurality of rollers may be mechanically coupled to said roller driving device. The mechanical coupling is understood to effect a driving force from the roller driving device to said roller(s) of said roller conveyor. Generally, the roller of the roller conveyor may be an idle roller such that the roller conveyor is built up from idle rollers only. A single or a plurality of mobile driving devices according to the invention may be employed for driving the rollers of the roller conveyor.

However, in another type of use, the mobile driving device may also serve to replace failed motor driven rollers in conventional roller conveyor setups. The mobile driving device may also serve to restart a pallet stuck into a gravity roller conveyor.

The mechanical coupling of the roller driving device to one or a plurality of rollers may be effected by frictional force, by a form locking action, or a combination thereof. Generally, the mechanical coupling of the roller driving device to the single or plurality of rollers should be releasable to allow coupling of the mobile driving device to different rollers of the roller conveyor depending on the position of the mobile driving device. The roller driving device is driven by a second drive unit serving to effect the driving and thus the conveying of the goods by the rollers. Said second drive unit may be partially integral with the first drive unit, e.g., by sharing the same motor, or may be a completely independent drive unit. Again, the second drive unit may comprise an electric motor as one example.

According to a first preferred embodiment said first drive unit comprises a drive motor and a coupling arranged between said drive motor and said traction device and wherein said second drive unit comprises said drive motor and a second coupling arranged between said drive motor and said roller driving device. According to this embodiment, both the first drive unit and the second drive unit receive their driving force from the same motor, such that only one motor could be employed at the mobile driving device. To allow independent control of the driving force of the first drive unit and the second drive unit, a coupling is arranged between the drive motor and the traction device and a further coupling is arranged between the drive motor and the roller driving device. These couplings are understood to be functionally arranged in the drivetrain of the driving force. The coupling may be a releasable clutch. Further, a gear could be arranged in the drivetrain or each drivetrain to effect a reduction or increase of the rotation and torque of the drive motor in relation to the movement of the traction device and the roller driving device, and such gear may be integral with a coupling. It is further understood that additional couplings, clutches, or gears may be present such as to allow a specific distribution of the driving force inside, e.g., the traction device. By this, rollers, wheels, or crawler tracks of the traction device can be driven in different speeds, such as to effect a driving along a curved path or a rotation of the mobile driving device about its vertical axis or other type of movements.

According to a further preferred embodiment, said first drive unit comprises a first drive motor and said second drive unit comprises a second drive motor. According to this embodiment, both the first drive unit and the second drive unit each comprise a drive motor. Thus, the mobile driving device comprises at least two drive motors. By this arrangement, the first drive unit and the second drive unit can be controlled individually by controlling the first drive motor and the second drive motor, respectively. It is understood that this embodiment comprising two drive motors may be employed as an alternative to the embodiment explained beforehand, but may as well be a preferred embodiment of this embodiment such that a first drive motor is commonly used via two couplings for the first drive unit and the second drive unit and a second drive motor is additionally provided for driving the traction device or the roller driving device. It is generally understood that two drive motors to individually drive the traction device and the roller driving device may form a basic configuration, which could be equipped with further drive motors in any or both the traction device and the roller driving device to effect a more intelligent drive control and to provide additional functionality or power to these devices.

According to a further preferred embodiment, said traction device comprises a roller arrangement, multiple wheels, a crawler track.

The configuration of the traction device may be designed in dependency from the required functionality and environment. If the mobile driving device is required to follow curved and straight paths and to be agile and have a high manoeuvrability, individual wheels at each corner of the device in. e.g. a four-wheel arrangement, a setup with a crawler track comprising two tracks at each side of the device or the like may be preferred. The wheels, rollers. or the crawler track may be steerable or may be in a fixed orientation in relation to the chassis frame. Generally, however, the traction device may even comprise two single rollers only, a three wheel-arrangement, a single crawler track. or any other type of arrangement for propelling the mobile driving device.

It is understood that the traction device may at the same time serve to support the mobile driving device on the supporting surface. such as a ground surface. However, the traction device may as well not be in contact with the supporting surface, but rather be in contact with other components, e.g., any components of the roller conveyor driven by the mobile driving device. In such case, additional rollers or wheels may be present, which support the chassis frame of the mobile driving device on the supporting surface and which may have no traction function or which may provide additional traction function to propel the mobile driving device.

According to a further preferred embodiment, said traction device is adapted to selectively move said chassis frame along a straight line or along a curved line on said supporting surface. According to this embodiment, the traction device is configured to selectively follow a straight line or a curved path. This could be employed by steering wheels or rollers or by wheels, rollers, or crawler tracks with a fixed orientation in relation to the chassis frame, which can be controlled such as to provide different speeds at the two sides of the mobile driving device. Generally, the agility provided by this embodiment can be helpful to follow a straight and curved path of a roller conveyor and can be further employed to direct the mobile driving device on a short way to a destination at the roller conveyor, where it is to be employed as a driving device.

According to a further preferred embodiment, the mobile driving device is improved by a lifting device for lifting said roller driving device relative to said chassis frame. According to this embodiment, the roller driving device can be coupled to and decoupled from a single or a plurality of rollers of the roller conveyor by a lifting action. This allows to position the mobile driving device underneath a roller conveyor in a decoupled condition of the roller driving device and to couple the roller driving device to the rollers of the roller conveyor by a lifting action of the roller conveyor device. It is understood that at least parts of the roller conveyor device are raised during this lifting action to effect the coupling. The lifting device may further be employed to press components of the roller driving device against the roller or the plurality of rollers of the roller conveyor to effect a frictional force or a safe transmission of the driving force to the rollers. The rollers may be modified at their circumferential surface or part thereof to offer high frictional transfer of forces when engaging the roller driving device, e.g., by knurling or specific coating.

It is particularly preferred that an extendable component is included in the lifting device, wherein said extendable component extends along at least a section of a belt like a chain, band. or any other type of strand. The extendable component is adapted to be extendable in such a direction to establish contact to the rollers of the roller conveyor in an extended condition. The extendable component may be employed to harmonize the pressure exerted by a belt onto a plurality of rollers. The extendable component may further be employed as a lifting device such that in a non-extended condition there is left a gap between the roller driving device and the rollers so that the rollers are nor driven. Generally, the extendable component may be in direct contact with the rollers in the extended condition, but, preferably, a belt, such as a chain, band, or the like, is interposed between the extendable component and the rollers. In particular, the roller driving device may comprise a support surface, the extendable component being supported on said support surface and the belt being supported on the extendable component such that the extendable component is interposed between the support surface and the belt. Further, a slide transfer component may be interposed between the extendable component and the belt such that the slide transfer component is stationary versus the extendable component and the belt is sliding along the slide transfer component if the belt is driven.

The extendable component may be formed by a tubular body, such as a hose, extend along the belt section. The tubular body may comprise an inner volume connected to a pressurized source of air to be pneumatically or hydraulically driven. A stopping element may be provided to limit the extent of extension of the extendable component. For example, a slide transfer component may be guided by a guide member comprising an abutting surface to limit the range of movement of the slide transfer element.

The lifting device may be driven by a separate drive unit or may be integrally driven by the second drive unit.

It is understood that as an alternative or additional feature, the roller driving device and the traction device may be controlled by a control unit such that with the chassis frame moving in relation to the rollers of the roller conveyor and the roller driving device being coupled to the rollers, the driving motion of the roller driving device is controlled to compensate the movement of the chassis frame and to maintain the rollers in a stationary, non-rotating condition. By this, the mobile driving device may be moved along the roller conveyor while being coupled to the rollers without effecting a rotation of the rollers such that a good on said roller conveyor will be kept stationary. With such a control, a lifting device may be omitted.

According to a further preferred embodiment, said roller driving device comprises a conveyor belt and a driving device for moving said conveyor belt. According to this embodiment a conveyor belt is driven by the second drive unit via a corresponding driving device for the conveyor belt.

It is generally understood that according to the invention a belt drive may be preferably be formed as an endless drive strand, but in some embodiments a non endless-drive strand may be used as a belt drive, e.g., in a reciprocating drive pattern. Further, a belt is generally understood to be formed as any type of strand, such as a chain, a band, or a toothed band or chain. A plurality of such strand may be arranged parallel to each other to form said belt.

The driving device may be a drum around which the conveyor belt is slung and the drum may be a drum motor to incorporate the second drive unit. The use of a conveyor belt in the roller driving device allows to effect a safe, frictional engagement to a plurality of rollers of the roller conveyor and to drive these rollers into a conveying motion. The conveyor belt may provide a straight upper surface and may be supported such that a frictional engagement to a plurality of rollers is effected. The conveyor belt may be an endless belt and may have such an effective tractive length in contact to the rollers such that two, three, four, five, six, seven, eight, or even more rollers are simultaneously in contact with the conveyor belt.

According to a further preferred embodiment said conveyor belt comprises a frictional surface facing upwards for engaging a frictional countersurface of one or a plurality of rollers of said roller conveyor device. Generally, the roller driving device can apply the driving force to the rollers of the roller conveyor from underneath such that a good to be conveyed by the roller conveyor may be positioned on top of the roller conveyor whilst the roller driving device is frictionally engaging the rollers from underneath opposed to said good.

According to a further preferred embodiment, the roller driving device comprises a form locking element for a form locking engagement in the interspace between two rollers of the roller conveyor and a friction element for a friction engagement of at least one roller of the roller conveyor, wherein preferably the form locking element and the friction element are integrally formed by a transfer element for transferring forces by frictional and form-locking engagement. According to this embodiment, the roller driving device is adapted to both engage in a form locking and a frictional engagement with the roller conveyor. This is achieved by a contact with the rollers of the roller conveyor such that the interspace between two rollers is used for a form-locking engagement and the roller surface is used for a frictional engagement. This can be achieved by an integral device. The twofold engagement can, in particular, be used to provide a driving action from the roller driving device to the rollers and at the same time to propel the roller driving device along the roller conveyor by the form locking engagement.

According to a further preferred embodiment, the roller driving device comprises one or a plurality of friction wheels and preferably the second drive unit is adapted to drive the one or plurality of friction wheels. In this embodiment a single or a plurality of friction wheels are employed to transfer the driving force from the roller driving device to the rollers of the roller conveyor. A single friction wheel may be used to establish contact to two rollers of the roller conveyor in that it is pressed against both rollers by being positioned into the gap between the two rollers. The friction wheel or the friction wheels may preferably have a diameter which is sufficient to contact both rollers for effective transmission of the driving force, and the diameter of the friction wheel may preferably be larger than the diameter of the rollers of the roller conveyor. If a plurality of friction wheels are provided at the roller driving device, these friction wheels may be aligned such as to provide a level and flush upper plane of the frictional circumference in the upper section of the friction wheels. The friction wheels may be arranged at the mobile driving device in such a way that the pitch of the friction wheels corresponds to the pitch of the rollers of the roller conveyor to be driven by the friction wheels, wherein the pitch is understood as the distance between two adjacent rotational axes of the rollers and the friction wheels, respectively. However, in other embodiments the position of the axes of the friction wheels may be variable such as to be able to adapt for different pitches of the rollers of the roller conveyor. In such case, a horizontal movement of the axes of the friction wheels or of a single axis of the friction wheels of the roller driving device may be functional to allow coupling of the roller driving device to roller conveyors having different pitches.

According to a still further preferred embodiment the roller driving device comprises the plurality of friction wheels and each friction wheel comprises a frictional circumferential drive surface for engaging a frictional countersurface of said rollers of said roller conveyor, wherein further each frictional wheel is rotatable about a wheel axis, said wheel axes being arranged along an endless bearing strand, wherein the endless bearing strand is driven by a strand drive unit and the friction wheels are driven by a wheel drive unit. According to this embodiment the friction wheels themselves are mounted to an endless bearing strand which could be an endless belt or chain or the like.

A preferred embodiment, a chain has friction plates on the outer circumferential surface in contact with the rollers and drive the rollers. In particular, a chain with two rows of such friction plates with the plates of the first row being in a staggered arrangement to the plates of the second row is preferred to realize a non-stuttering drive of the roller. The two rows of friction plates may also be realized with two separate chains or a twin chain. The advantage of two chains or a twin chain is, that the drive sprockets can be mounted in a slight angular rotation to each other about the axis of rotation of the drive sprockets. Hereby, the play between the chains and the sprockets can be minimized to improve a non-stuttering drive.

The endless bearing strand serves to position the rotational axes of the friction wheels and to move the friction wheels along a closed path in relation to the chassis frame. By this embodiment, it is possible to couple the friction wheels to a first set of rollers of the roller conveyor and to move the roller driving device along the track of the roller conveyor by coupling the friction wheels to other rollers of the roller conveyor subsequently. This movement along the track of the roller conveyor can be performed by continuous coupling of the friction wheels to rollers of the roller conveyor at one end of the endless bearing strand and continuous decoupling of the friction wheels from the rollers of the roller conveyor at the other end of the endless bearing strand by moving the endless bearing strand. Thus, raising and lowering of the whole roller driving device may not be required for this movement to follow the track of the roller conveyor.

As a second function of this possibility, to continuously couple and decouple the friction wheels to and from the rollers, the movement of the endless bearing strand may serve as a traction device such that the mobile driving device is driven along the track of the roller conveyor by this type of traction device being incorporated into the endless bearing strand of the roller driving device.

Thus, it is further preferred that the traction device comprises the endless bearing strand and the first drive unit is adapted to drive the endless bearing strand. According to this embodiment the driving force to propel the mobile driving device is effected onto the endless bearing strand and thus the mobile driving device is propelled by the movement of this endless bearing strand. In particular, this movement will precisely follow the track of a roller conveyor if the friction wheels supported at the endless bearing strand are in contact to the rollers of the roller conveyor. It is generally understood that the friction wheels may be driven by a mechanical engagement using the driving force of the first drive unit as well. Still further, it is to be understood that the second drive unit may be coupled to the friction wheels such as to effect a rotation of the friction wheels about their rotational axes such that the rotation of the friction wheels can be controlled independently from the movement of the endless bearing strand.

Generally, it is to be understood that the movement of the endless bearing strand and the rotation of the friction wheels can be controlled in such a way that the circumferential surface of the friction wheels conduct a relative motion which is oriented such that the friction wheels move twice as fast at their top end and reverse to the endless bearing strand. This will allow to move the friction wheels along a track of the roller conveyor and to drive the rollers of the roller conveyor by frictional engagement between the friction wheels and the rollers from underneath and to hereby propel the mobile driving device with the same speed as a good transported on top of the roller conveyor by the driving action of the friction wheels. Thus, the good to be transported and the mobile driving device move synchronously along the roller conveyor track and the friction wheels provide the driving force to the rollers by a double speed reverse rotation from underneath to the rollers.

According to a further preferred embodiment, wherein the chassis frame is supported on the supporting surface by an undercarriage adapted for passive motion or driven motion, the mobile driving device can be further improved by a control unit adapted to control the first drive unit such that: in a first traction mode, the endless bearing strand is driven by said first drive unit and said undercarriage are maintained in a passive motion status; in a second traction mode, the endless bearing strand is maintained in a passive motion status and said undercarriage is driven.

According to this embodiment, two different modes for driving the mobile driving device can be selected. In a first traction mode, the endless bearing strand is driven and thus, the friction wheels may be supported by. e.g. a frictional force or a form locking action such as to act against a counterface to drive the mobile driving device hereby. Thus, in this first traction mode, the motion of the endless bearing strand serves to propel the mobile driving device. The undercarriage is thus maintained in a passive motion status and only serves to carry the weight of the mobile driving device and allow the mobile driving device to slide or roll over the supporting surface. A passive motion status is understood to allow the undercarriage to follow the movement of the mobile driving device, such that in the passive motion status the undercarriage neither provides a driving force nor a braking force. In a second traction mode, the undercarriage is driven and thus provides the propelling force for the movement of the mobile driving device over the ground surface. In this second traction mode, the endless bearing strand is maintained in a passive motion status and thus the friction wheels and the endless bearing strand may perform a relative movement versus the mobile driving device or at the mobile driving device without providing a driving or braking force to the motion of the mobile driving device over the supporting surface.

According to a further preferred embodiment, the friction wheels are driven by a drive surface. According to this embodiment, a drive surface is present, which may contact the friction wheels as a tangential surface to a circumferential surface coupled to or embodied at the friction wheels. This particular arrangement of a drive surface allows rotating the friction wheels by a translational movement of the rotational axis of the friction wheels accomplished by movement of the endless bearing strand or any other type of guidance and movement of the rotational axis. The drive surface may directly act against the frictional circumferential surface of the friction wheels, which at the same time transfers the driving force to the rollers of the roller conveyor driven by the mobile driving device. Alternatively, the friction wheels may be coupled to a circumferential surface which may have a smaller diameter than the circumferential surface of the friction wheels being in contact with the rollers of the roller conveyor. By this, an increased rotational speed of the friction wheels when driven by a translational movement of the rotational axis along a drive surface being stationary at the mobile driving device will be achieved, thus allowing to drive the mobile driving device along a track of a roller conveyor and to direct the friction wheels along an endless bearing strand such that a relative movement of the rotational axis is stationary for those friction wheels being in contact with the rollers of the roller conveyor and to drive the rotation of the friction wheels by a contact to a drive surface, which is stationary at the mobile driving device and thus moving with the mobile driving device in relation to the rotational axes of those friction wheels, which are in contact and stationary with the rollers of the roller conveyor.

In a preferred embodiment hereto, the drive surface is a fixed surface or the drive surface is arranged at a drive belt and the drive belt is driven by a drive unit or is kept in a stationary position. According to this embodiment, the drive surface may be a fixed surface to allow functionality and relative rotation of the friction wheels and the movement of the rotational axes of the friction wheels as described beforehand. Further, the drive surface may be arranged at a drive belt, which may be controlled such that it is driven by a drive unit to be in relative motion to the chassis frame of the mobile driving device or to be kept stationary in relation to the chassis frame. This arrangement will allow bringing the friction wheels into rotation even if the mobile driving device is kept stationary to the roller conveyor, which is driven by the friction wheels in that the drive belt is moved and thus drives the friction wheels into rotation. In particular, the drive belt may be arranged in a parallel arrangement to the endless bearing strand at which the rotational axes of the friction wheels are located.

According to a further preferred embodiment, the mobile driving device is improved by an energy storage device connected to the first and second drive units. Such an energy storage device will allow the mobile driving device to move without the need for external energy supply and to drive a roller conveyor without such need of external energy supply. The energy storage device may be coupled to the first and second drive units to supply energy to these drive units. The energy storage device may be adapted for storing or producing electrical energy, e.g., by using a battery or a rechargeable battery or a hydrogen fuel cell as energy storage device.

According to a further preferred embodiment, the mobile driving device is improved by a control unit coupled to the first drive unit, wherein the control unit is adapted to control the first drive unit such that the first drive unit drives the chassis frame along a predetermined path on the supporting surface or to a predetermined destination on the supporting surface. According to this embodiment, the mobile driving device further comprises a control unit, which is adapted to control the movement of the mobile driving device in terms of speed and direction. By this, the mobile driving device can be driven along a predetermined path or driven to a predetermined destination on the ground surface. Such control of the movement may be preprogrammed and stored in a memory coupled to the control unit or transmitted to the control unit from an external central control device. It is further understood that the control unit may be adapted to control this movement as an independent and intelligent movement of the mobile driving device by relevant input from sensors or the like giving information about the environment to the control unit. Further, the control unit may alternatively be or additionally be adapted to receive real-time control signals containing information about a predetermined path or a predetermined destination from an external control unit being in wireless communication for data transfer with the control unit on board of the mobile driving device. Still further, the control unit may be adapted to control the first drive unit such as to fulfil a certain conveying action when the mobile driving device is in contact with a roller conveyor and drives the roller conveyor. It is understood that the control unit may further be coupled for signal transmission to the second drive unit to both control the first drive unit and the second drive unit for conducting specific predetermined conveying actions at the roller conveyor.

Still further, the mobile driving device can be further improved by the supporting surface extending along an X-axis and a Y-axis defining a coordinate system, wherein the control unit is adapted to control the first drive unit such that the chassis frame is positioned in a predetermined orientation in relation so the coordinate system on the supporting surface. According to a further preferred embodiment, the control unit is additionally adapted for positioning the mobile driving device in a specific orientation in relation to the vertical axis on the supporting surface, such as, e.g., a ground surface. Such predetermined orientation will be helpful to ensure a safe and correct coupling of the roller driving device to a roller conveyor to drive the roller conveyor thereafter.

According to a further preferred embodiment, the mobile driving device is improved by a control unit coupled to the first drive unit and the second drive unit, wherein the control unit is adapted to control the first and second drive unit such that in a first mode the first drive unit is stopped and the second drive unit is driven, in a second mode the first drive unit is driven such that the chassis frame moves along the supporting surface with a first velocity and the second drive unit is driven such that a frictional surface of the roller driving device is driven with a second velocity, the second velocity being twice as high as the first velocity. According to this embodiment, the control unit is adapted to control the traction device and the roller driving device in at least two modes.

In the first mode, the first drive unit is stopped such that the traction device does not move the mobile driving device across the ground surface, and the second drive unit is driven such that the roller driving device drives the rollers of the roller conveyor and thus effects a conveying of the goods on the roller conveyor. In this first mode, it is understood that the goods on the roller conveyor are conveyed relative to the mobile driving device and, thus, the distance between the mobile driving device and the goods is increased by this conveying action. This will typically result in the goods being moved out of the conveying zone, which is driven by the roller driving device and, thus, the first mode can be used to handle over a good on the roller conveyor to another position out of the range of the mobile driving device, such as, e.g., to the downstream conveyor zone.

In the second mode, the mobile driving device is moved across the ground surface with a first speed, and the roller driving device is driven with a second speed at the frictional surface of it, which is in contact with the rollers of the roller conveyor. By this, a driving force can be transferred to the rollers of the roller conveyor, which is compensating the relative movement of the roller driving device in relation to the rollers and further effects a driving force onto the rollers to convey a good positioned on these rollers with the same velocity as the speed of the movement of the mobile driving device, i.e., with the first velocity. By this, the mobile driving device and the good(s) on the roller conveyor will move synchronously and the good(s) can be conveyed by the driving force of the mobile driving device along the whole track of the roller conveyor and across several conveyor zones.

Still further, the mobile driving device can be improved by a control unit coupled for signal transmission to the first drive unit for driving the chassis frame, wherein the control unit is coupled for signal transmission to a sensor device arranged at the chassis frame the sensor device being adapted to recognize an object in the environment of the chassis frame and to send a sensor signal to the control unit in case of an object being recognized, wherein preferably the control unit is adapted to control the drive unit such as to avoid a collision with an object. According to this embodiment, the mobile driving device is equipped with at least one sensor, like a camera adapted to recognize an object. The object may be an obstacle or a structure or pattern serving to provide information about the position and/or orientation of the mobile driving device. For example, the object may be a pattern like a printed code, a bar code, or an RFID tag which is sensed by the sensor wherein the control unit is adapted to extract from the sensor signal information about the roller conveyor to which the mobile driving device is currently engaged or a position along the conveying path of such a roller conveyor. In particular, the control unit may be adapted to determine such position along the conveyor path by identifying a predetermined object, comparing the size of the object as detected by the sensor with another size of an object, and to calculate the distance of the sensor from the object from the comparison step. The other object which size is compared may be a reference value stored in a memory of the control unit or may be another object at another location which is detected by the sensor or another sensor connected to the control unit. In particular, the two objects which size is compared by the control unit may be arranged at opposed sides of the mobile driving device. By this, the position may be determined rather precisely. The object may comprise an individual code to allow determination of a position along a conveyor track and identification of the conveyor track by the control unit at the same time.

Still further, according to this embodiment, the mobile driving device may be equipped for autonomous driving or partial autonomous driving in that it is equipped with the one or a plurality of sensors for detecting any marks or obstacles in the environment. The control unit may hereby be able to control the traction device in such a way that a predetermined destination is reached by selecting an individual and intelligent path avoiding obstacles on the way to the predetermined destination.

In particular, it is preferred that the sensor device is a camera wherein the control unit is adapted to process an image signal provided by the camera such as to identify an object. Generally, a single camera or two cameras being directed in different directions may allow detecting any obstacles in the environment of the mobile driving device. In such case, an image processing is conducted by the control device to identify such obstacles and to recognize any landmarks or other signs in the environment of the mobile driving device.

Still further, it is preferred that the traction device is adapted to support the chassis frame on a supporting track surface formed at the roller conveyor. By this, the chassis frame can be guided by and safely moved in or on a frame of a roller conveyor. For example, in a simple and durable setup the traction device may be supported on two sideway frame profiles of the roller conveyor in which the rollers are rotatably mounted and thus be installed underneath the rollers to move along the sideway frames.

Finally, the mobile driving device can be further improved by a conveyor track section comprising a supporting track surface, wherein the conveyor track section comprises a conveyor track section traction device and is adapted to couple to a first conveyor track in a first position of the conveyor track section, to move to a second position by driving the conveyor track section traction device and to couple to a second conveyor track in the second position of the conveyor track section, wherein preferably the conveyor track section traction device is adapted to move the conveyor track section in a direction orthogonal to a conveying direction of the first conveyor track. In this embodiment the mobile driving device is adapted to be positioned in or at a conveyor track section which itself is movable on a ground floor or any other supporting surface. The conveyor track section itself comprises a supporting surface to carry the traction device of the mobile driving device. By this, the mobile driving device is movable together with the conveyor track section and may be moved to a conveyor track hereby. If the conveyor track section is coupled to a conveyor track of the roller conveyor, the mobile driving device may move out of the conveyor track section and move along the whole conveyor track. The conveyor track section may be adapted to take up a good or a pallet on top of the rollers of the conveyor track section such that this good or pallet is moved together with the conveyor track section from one conveyor track to another conveyor track.

According to a further aspect of the invention. a method of conveying goods on a roller conveyor, comprising the steps of driving a chassis frame to the roller conveyor by a traction device arranged at the chassis frame, coupling a roller driving device arranged at the chassis frame to the roller conveyor, driving rollers of the roller conveyor by a frictional engagement, wherein the frictional engagement is established between a friction wheel or a conveyor belt of the roller driving device.

The method can be improved in that the friction wheel or the conveyor belt is moved in relation to the chassis frame and the chassis frame is moved in relation to the roller conveyor.

The method can be further improved in that the frictional engagement is established by lifting the friction wheel or the conveyor belt in relation to the chassis frame.

Still further, the method can be improved in that the chassis frame is driven along the roller conveyor.

Finally, the method can be improved in that the frictional engagement is established by a plurality of friction wheels, and wherein each friction wheel is rotating about a wheel axis and the wheel axes are moved along an endless path.

The method of the invention and the preferred embodiments of the method can be preferably conducted using the mobile driving device explained beforehand. It is understood that the specific aspects and features of the method as well as the functions thereof correspond to the respective features, functions, and aspects of the mobile driving device as described beforehand and thus reference is made to the explanation given hereto with reference to the mobile driving device.

BRIEF DESCRIPTION OF THE DRAWINGS

Preferred embodiments of the invention are described with reference to the figures. In the figures.

DETAILED DESCRIPTION OF THE EMBODIMENTS

Figure 1:
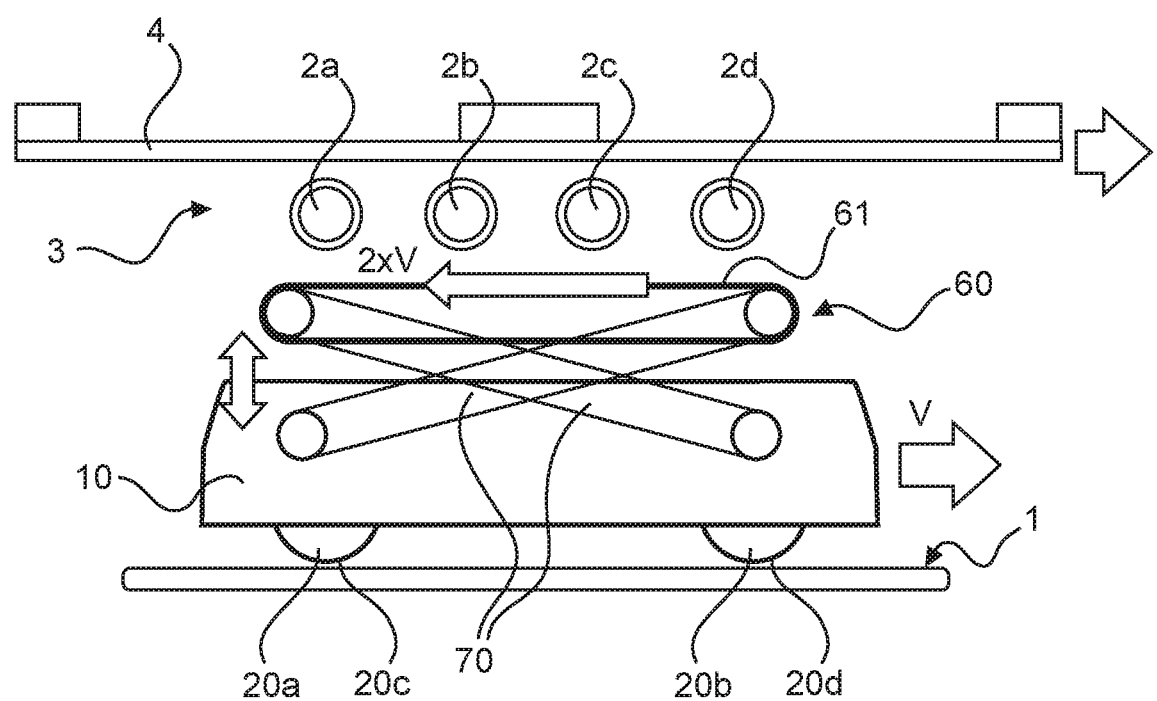
FIG. 1 shows a schematic side view of first embodiment of a mobile driving device.
Figure 2:
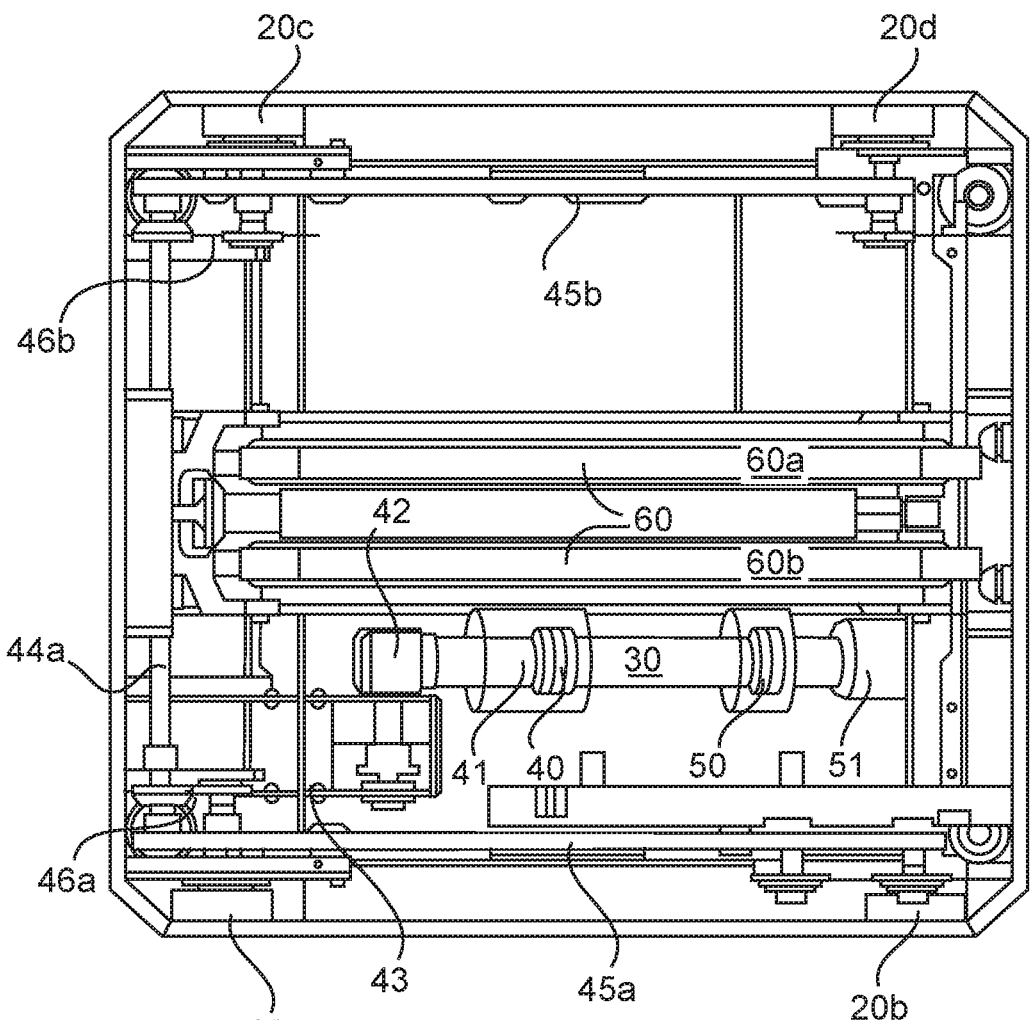
FIG. 2 shows a top view on the first embodiment shown in FIG. 1.

Making reference first to FIGS. 1 and 2, a mobile driving device according to a first embodiment of the invention comprises a chassis frame 10, which is supported on a ground surface 1 by four wheels 20a-d. The wheels are positioned basically at the four corners of the device. The wheels 20a-d are arranged to support the chassis frame on a ground surface. Basically, the wheels 20a-d may support the device on rails or on any surface provided within a frame, such as a roller conveyor frame.

Inside the chassis frame 10, an electric motor 30 is installed. The electric motor 30 is coupled at one end of the motor via a clutch 40 incorporating a brake 41 to a transmission system. The transmission system comprises a gear 42, a belt transmission 43 to a shaft 44, which shaft 44 is distributing the driving force of the electric motor 30 to both sides of the chassis frame 10.

A belt transmission 45a, 45b from the shaft 44 distributes the driving force from the shaft 44 at one end of the chassis frame 10 to the opposed end of the chassis frame 10. The wheels 20a, 20c adjacent to the shaft 44 are driven by a gear 46a, 46b from the shaft 44 and the wheels 20b, 20d are driven via the belt transmission 45a, 45b such that a four-wheel driven chassis frame is provided in this embodiment.

It is understood that the belt transmission 45a, 45b could be omitted thus resulting in a two-wheel drive by the wheels 20a, 20c. it is further understood that the shaft 44 and the belt transmission 45b could be omitted thus resulting in a two-wheel drive on one side of the chassis frame 10 by the wheels 20a, 20b.

The electric motor 30 is coupled via a second clutch 50 at the other end opposed to the clutch 40 to a gear 51, which is coupled to an endless drive strand 60. The endless drive strand 60 is configured as a belt transmission comprising two parallel endless chains 60a, 60b with frictional pads at the outer surface. These two parallel chains 60a, 60b serve to couple by frictional engagement to the rollers 2a-d of a roller conveyor 3 and by driving the endless chains 60a, 60b, the rollers 2a-d can be put into rotation to convey a pallet 4 lying on top of the rollers 2a-d.

As can be seen in FIG. 1, the endless chain 60a, 60b is coupled to the chassis frame 10 via a lifting device 70, which allows to raise the endless chain 60a, 60b or to lower the endless chain 60a, 60b in relation to the ground surface 1. By this, the endless chain 60a, 60b can be coupled to the rollers 2a-d of a roller conveyor 3 such as to have frictional engagement to a bottom circumferential section of the rollers 2a-d. The lifting device 70 may exert a contact pressure sufficient to transfer a frictional driving force to the rollers 2a-d for conveying the pallet 4 lying on top of the rollers 2a-d. As can be seen in FIG. 1 in a typical mode of operation, wherein the pallet 4 shall be conveyed along the conveyor track by the mobile driving device, the mobile driving device is driven across the ground surface 1 with a constant speed V, and the endless chain 60a, 60b is driven with a constant speed $2xV$, which is twice the speed of the chassis frame 10 over the ground surface 1. The endless chain 60a, 60b is driven in a direction such that the upper section 61 moves in an opposite direction in relation to the movement of the chassis frame 10 over the ground surface 1. By this, the pallet 4 and the chassis frame 10 will move synchronously along the track of the roller conveyor 3, and the pallet 4 can be conveyed by the mobile driving device along the whole conveyor track.

Figure 3:
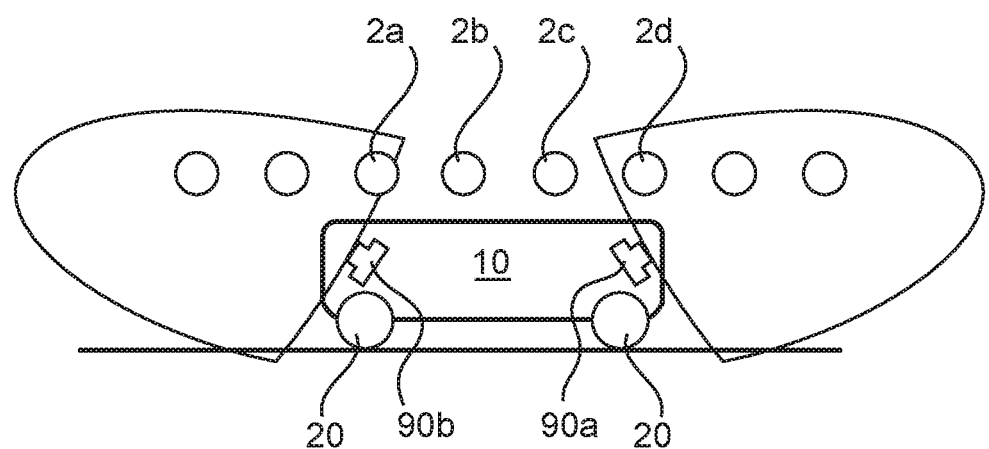
FIG. 3 shows a schematic view of a mobile driving device according to the first or second embodiment showing the details of sensor detection of the environment.

FIG. 3 shows a schematic side view of a chassis frame 10 with wheels 20 and it is understood that the features and details shown in this embodiment could be applied to both the first embodiment explained beforehand and the second embodiment described hereafter. As can be seen, two time of flight cameras 90a, 90b are mounted to the chassis frame 10 at the front end and the rear end and are oriented to observe the environment before and behind the chassis frame 10. It is to be noted that the time of flight cameras 90a, 90b both observe the horizontal space in front and behind the chassis frame 10 and further observe the space between and above the rollers 2a and 2d of a roller conveyor 3 positioned above the chassis frame. By this, the time of flight cameras 90a, 90b can detect both an obstacle and any marks in the pathway of the chassis frame 10 or sideways thereof and a pallet on top of the roller conveyor 3. An image analysis by a control unit of the images detected by the two time of flight cameras 90a, 90b thus allows precisely determining whether a pallet is in the range or above the chassis frame and to control the movement of the chassis frame in such a way as to position the chassis frame 10 exactly below such a pallet.

Figure 4A:
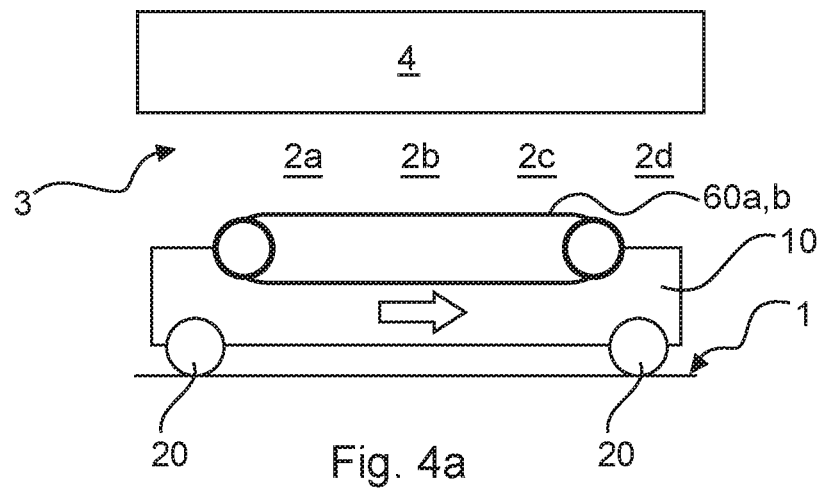
FIGS. 4a-c show a schematic partial view of the first embodiment in three different modes of operation.
Figure 4B:
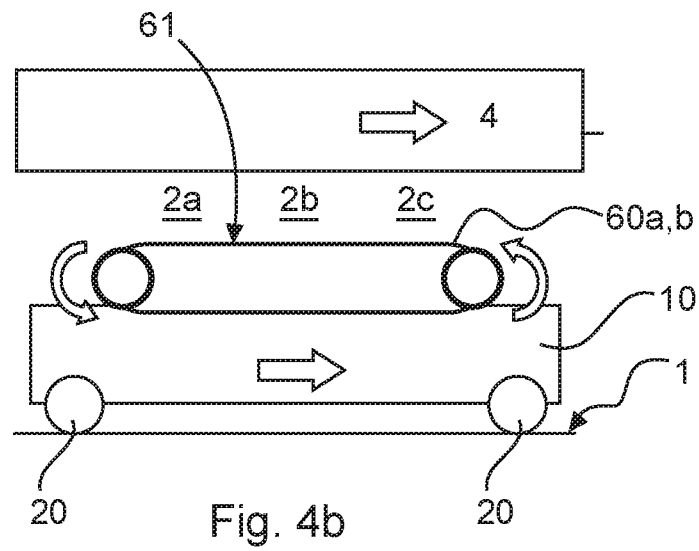
Figure 4C:
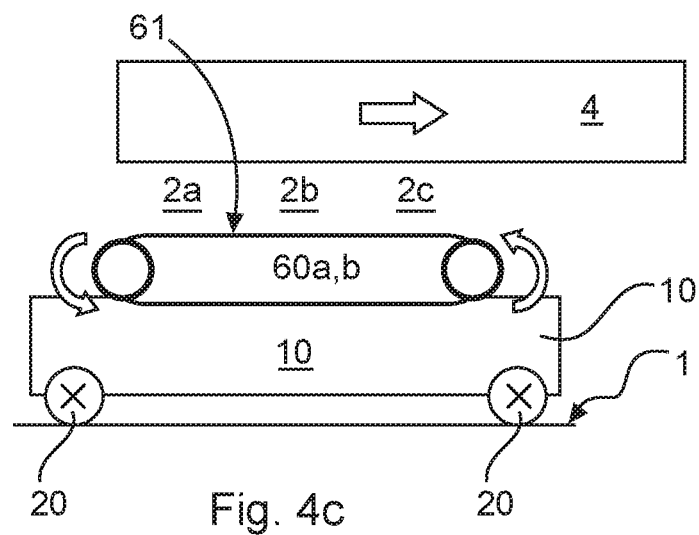

Making reference now to FIGS. 4a-c, three different modes of operation are shown in these figures.

In FIG. 4a, the chassis frame 10 is moving across the ground surface by the wheels 20 being driven and the endless chains 60a, 60b are not coupled to the roller conveyor. By this, the mobile driving device can be positioned at a location underneath the rollers 2a-c of the roller conveyor 3.

In FIG. 4b, the endless chains 60a, 60b are coupled to the rollers 2a-c of the roller conveyor by contacting the bottom circumferential part of the rollers. The chassis frame 10 is driven by the wheels 20 and the endless chains 60a, 60b are driven as well. In this operation mode, the driving speed of the endless chains 60a, 60b is twice as high as the driving speed of the chassis frame 10, and the movement of the upper section 61 of the endless chain 60a, 60b, which is in contact with the rollers 2a-c versus the chassis frame 10, is opposite to the direction of movement of the chassis frame 10 over the ground surface 1. By this, the rollers 2a-c of the roller conveyor are rotated such that a pallet 4 positioned on top of these rollers 2a-c is driven synchronously with the chassis frame 10, i.e., with the same speed and direction of the chassis frame 10 over the ground surface 1. By this, the pallet 4 can be moved along the conveyor track formed by the rollers 2a-c continuously by the mobile driving device.

In the operational mode shown in FIG. 4c, the chassis frame 10 is kept stationary on the ground surface 1 and the endless chain 60a, 60b is driven. In this operation mode, the pallet 4 may be handed over to an adjacent downstream or upstream zone of the conveyor track. The speed of the endless chain 60a, 60b will, in this case, correspond to the conveying speed of the pallet 4 and may be identical to the speed of the chassis frame 10 over the ground surface 1 in FIG. 4b, but is directed in the same direction as in FIG. 4b. By this, a constant conveying speed can be maintained from FIG. 4b to FIG. 4c.

Figure 5A:
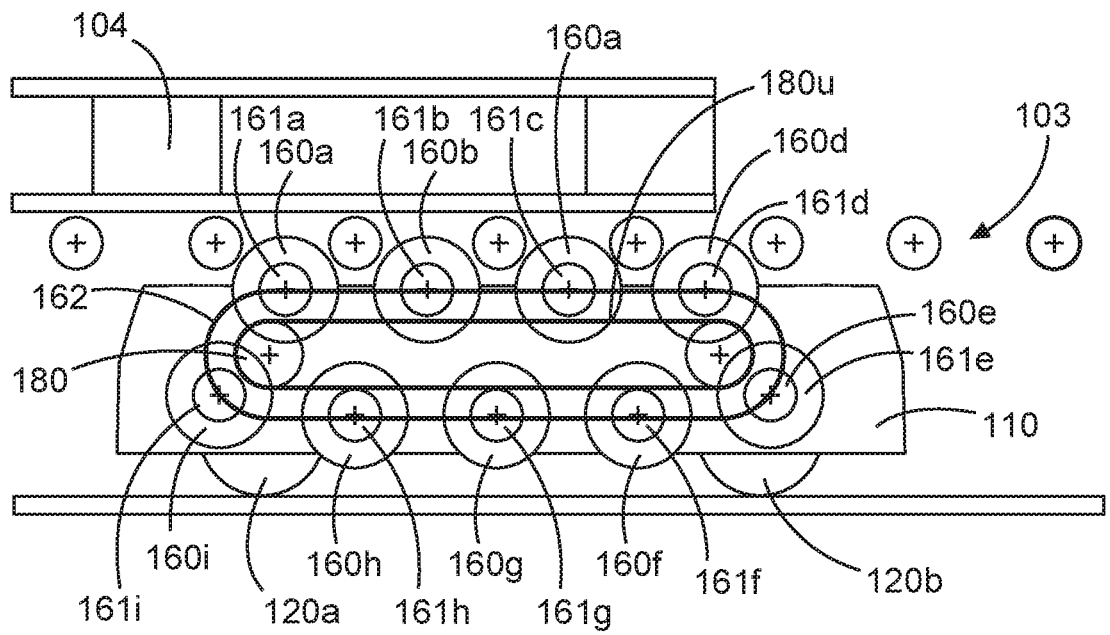
FIG. 5a shows a second embodiment of the mobile driving device according to the invention in a schematic view of a first mode of operation.
Figure 5B:
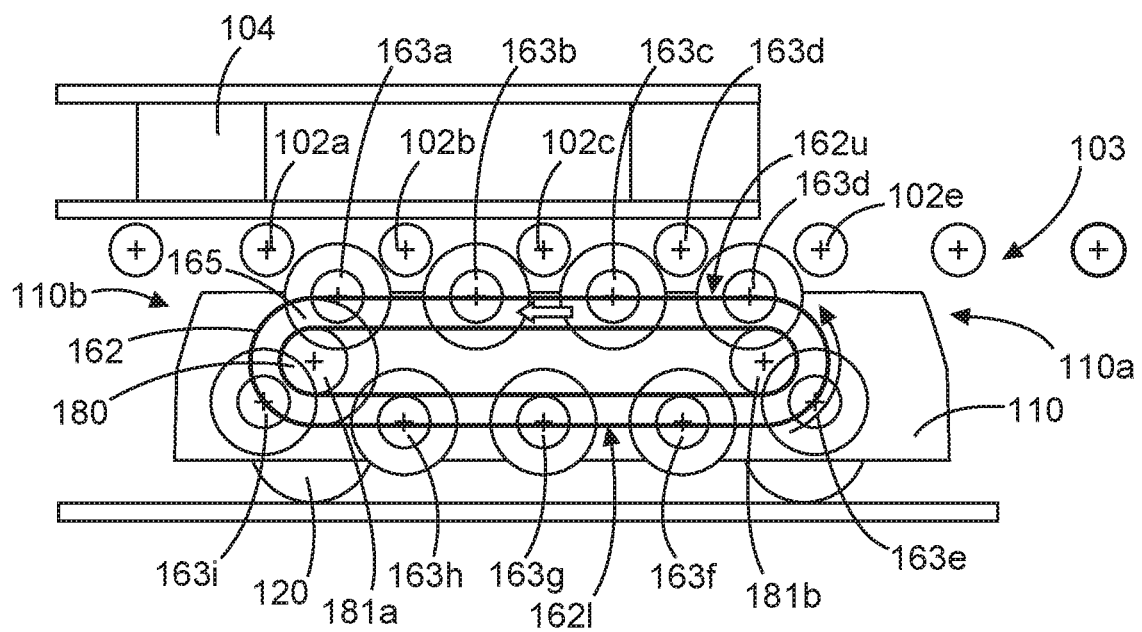
FIG. 5b shows the second embodiment of FIG. 5a in a second mode of operation.

Making reference now to FIGS. 5a and 5b, a second embodiment of the invention comprises a chassis frame 110 and traction wheels 120a, 120b in an arrangement similar to the arrangement of the first embodiment. Again, the traction wheels 120a, 120b can be driven by an electrical motor and two-wheel drive or four-wheel drive or even a single-wheel drive may be realized.

In the second embodiment, the roller driving device comprises a plurality of friction wheels 160a-i. In total, nine such friction wheels are embodied, but it is understood that another number of friction wheels may be present in variations hereof as well. Each friction wheel 160a-i is mounted for a rotational movement about a rotational axis 161a-i and said rotational axes 161a-i are mounted to an endless bearing strand 162. The endless bearing strand 162 is guided along an oval path with a flat upper and flat bottom track section. The friction wheels 160a-i are distributed evenly along the endless bearing strand 162 and the rotational axes 161a-i move together with the endless bearing strand 162 along the oval path.

As can be seen from FIGS. 5a, 5b generally, the friction wheels 160a-d in the upper track section 162u are in frictional engagement with rollers 102a-e of a roller conveyor 103 positioned above the friction wheels. Each friction wheel in the upper track 160u is in contact with two rollers of the roller conveyor and each roller of the roller conveyor is in contact with two friction wheels. The friction wheels in the lower track section 162 and in the front and end section wherein the friction wheels change between the upper and the lower track section are not in contact with the rollers of the roller conveyor. Since each friction wheel reaches into the space between two rollers a frictional and form-locking engagement is established between the friction wheels and the rollers.

A rotational movement of the friction wheels 160a-l about the rotational axes 161a-i will drive the rollers 102a-e of the roller conveyor 103 and will thus effect a conveying action onto a pallet 104 positioned on top of the rollers of the roller conveyor as shown.

In the depicted arrangement of FIGS. 5a, 5b the friction wheels may turn anti-clockwise to move the pallet 103 to the right, thus, the upper frictional surface of the friction wheels moves to the left, i.e., opposite to the movement of the pallet 103.

The friction wheels are driven by a drive belt 180. The drive belt 180 runs parallel to the endless bearing strand 162, but is positioned inside the path defined by the endless bearing strand 162. The drive belt 180 is guided by two drums 181a,b at the front end and at the rear end of the chassis frame 110.

The drive belt 180 is in frictional engagement with friction drive rollers 163a-i, which are coaxial and mechanically coupled to the friction wheels 160a-i. Thus, each friction wheel 160a-i is mechanically coupled to a friction drive wheel 163a-l to be driven by the drive belt 180.

Still further, it is understood that the guidance of the endless bearing strand may be provided by endside drums 165 which are coaxial to the endside drums 181a,b. Alternatively the guidance of the endless bearing strand 162 may be provided by the contact of the friction drive wheels 163a-i being in contact with the drive belt 180. Thus, the endless bearing strand 162 does not necessarily require a separate guiding by drums or the like. However, it is understood that the endless bearing strand 162 may be guided by rails, drums, or the like.

The diameter of the friction drive wheels 163a-i is half of the diameter of the friction wheels 160a-i, thus effecting a gear transmission from the drive belt 180 to the friction circumferential surface of the friction wheels 160a-i.

In the operation mode shown in FIG. 3a, the traction wheels 120a, 120b are driven clockwise such as to propel the chassis frame 110 in a first direction to the right in the figure. The friction drive belt 180 is driven with the same speed as the wheels 120a, and the upper track section 180u is driven into the first direction to the right, i.e., in the same direction as the movement of the chassis frame 110. By this, the friction wheels 160a-l are driven counterclockwise with a double speed at the circumferential frictional surface being in contact with the rollers of the roller conveyor. By this, the movement of the chassis frame is overcompensated and the rollers 102a-e are driven with such a speed as to convey the pallet 104 with the same speed as the chassis frame 110 such that chassis frame 110 and pallet 104 move synchronously along the track of the roller conveyor 103. The endless bearing strand 162 is kept in a passive mode such that it can follow the relative movement of the friction wheels in relation to the chassis frame 110. Thus, the upper track section 162u moves backward in relation to the chassis frame 110 and opposite to the direction of movement of the chassis frame 110.

In the operational mode shown in FIG. 3b, the friction drive belt 180 is driven in the same way as in the operational mode of FIG. 3b, i.e., the upper track section 180u is driven in a first direction to the right. In this operational mode, the traction wheels 120a, 120b are kept passive, so that no driving or braking force is effected by these traction wheels, but the wheels are free to roll and to follow the movement resulting from forces acting onto the chassis frame 110.

The endless bearing strand 162 is driven by a drum 165, which is coaxial with the left drum 181a of the friction drive belt 180. The movement of the endless bearing strand 162 is opposite to the movement of the friction drive belt 180 and at the same speed. By this, the rotational axes 161a-i are moved by the endless bearing strand 162, and thus the friction wheels 160a-l engage in a formlocking force transfer action with the rollers 102a-e of the roller conveyor 103. By this, a driving force is transmitted by horizontally supporting the friction wheels at the rollers of the roller conveyor and driving the endless bearing strand with the friction wheels fixed thereto. Thus, the general type of motion of the operational mode, shown in FIG. 3b, is similar to the mode shown in FIG. 3a, but the driving force results from the driven endless bearing strand 162 in FIG. 3b and results from driven traction wheels 120a, 120b in FIG. 3a. In both operation modes, the friction wheels 160a-l subsequently engage with the rollers of the roller conveyor at the front end 110a of the chassis frame and disengage from the rollers of the roller conveyor at the rear end 110b of the chassis frame 110. Thus, a type of horizontal climbing action of the friction wheels at the rollers of the roller conveyor takes place and provides the driving force.

Figure 6A:
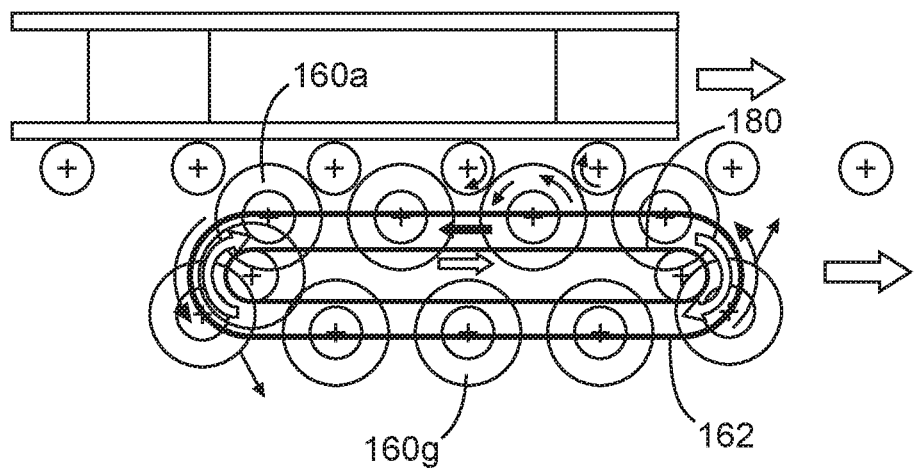
FIGS. 6a-c show a schematic partial view of the second embodiment in three different modes of operation.
Figure 6B:
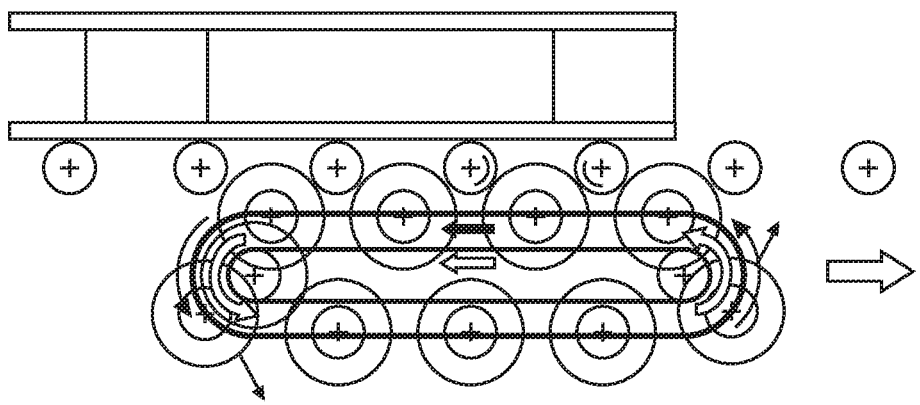
Figure 6C:
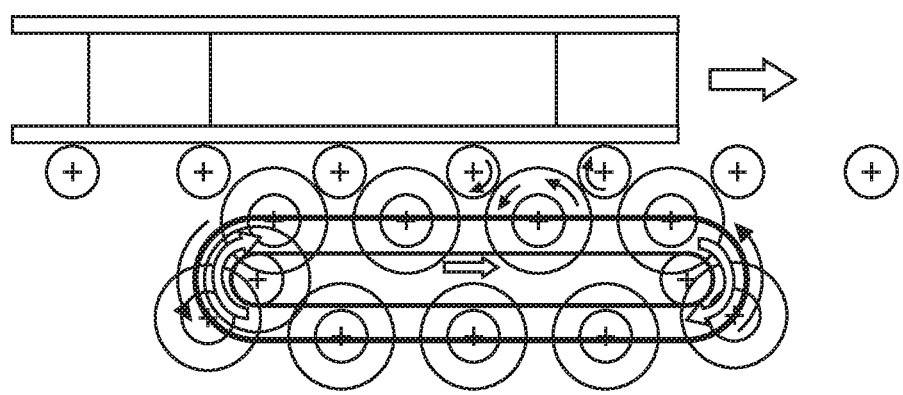

FIGS. 6a-c show three different operational modes and it is generally understood that both modes of FIGS. 6a and 6b could be accomplished with either driven wheels and passive endless bearing strand according to FIG. 5a or passive wheels and driven endless bearing strand according to FIG. 5b.

In the operational mode of FIG. 6a, the upper track section of the friction drive belt 180 is driven in a first direction to the right and thus propels the friction wheels 160a-i and the chassis frame is driven in the first direction to the right, which is realized in this depicted configuration by driving the upper track section of the endless bearing strand 162 in a second direction to the left opposite to the first direction. By this, the chassis frame and the pallet are moved synchronously along the conveyor track.

In the operational mode shown in FIG. 6b, the chassis frame is driven in the first direction in the same way, which is again accomplished by driving the upper track section of the endless bearing strand 162 in the second direction. In this operational mode, the upper track section of the drive belt 180 is driven in the second direction as well, thus compensating the movement of the rotational axis with the endless bearing strand and maintaining the friction wheels 160a-i in a non-rotating position about the rotational axes 161a-i. By this, the chassis frame is driven along the conveyor track and the pallet is kept in a fixed position on top of the rollers of the roller conveyor.

In the operational mode shown in FIG. 6c, the chassis frame is kept in a fixed position by blocking the endless bearing strand 162 in a constant fixed position or by blocking the traction wheels 120a, 120b by a brake. The upper track section of the friction drive belt 180 is driven in the first direction to the right, thus driving the friction wheels 162a-i counter-clockwise. By this, the pallet 104 is driven in the first direction to the right by keeping the chassis frame fixed. By this, the pallet 104 can be handed over to a downstream conveyer zone on the right.

Figure 7A:
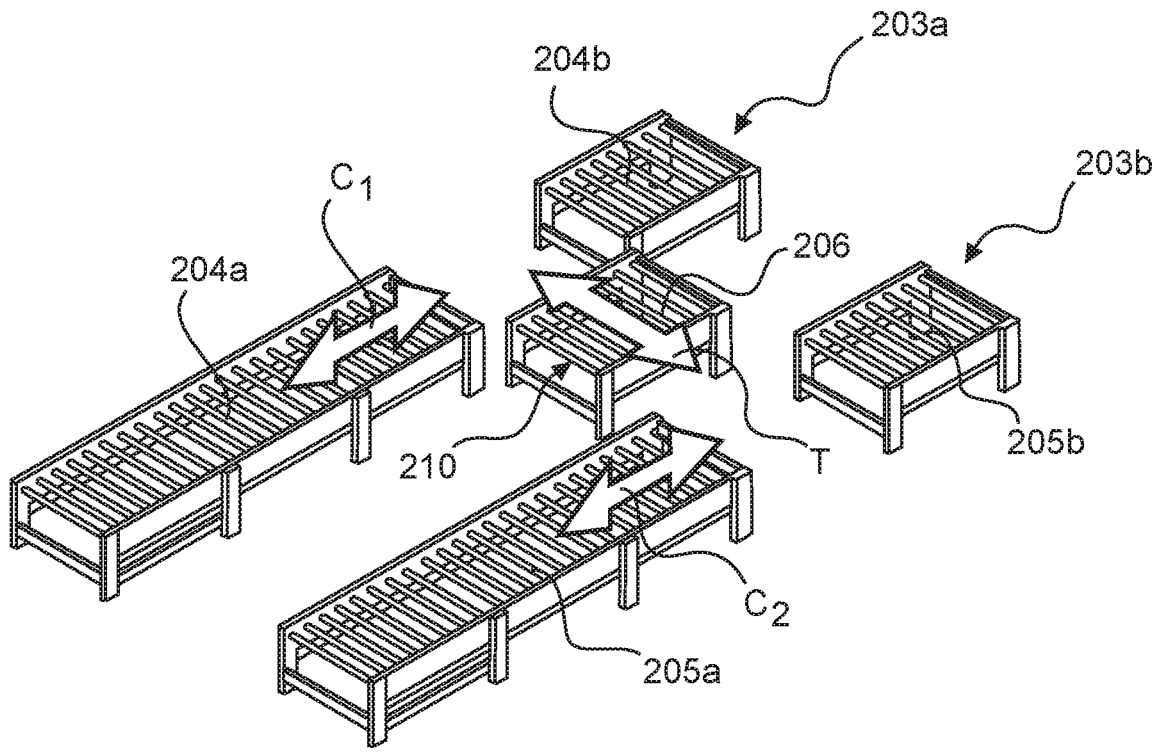
FIGS. 7a-b show a schematic perspective view of a mobile driving device according to the invention installed in an arrangement of two roller conveyors.
Figure 7B:
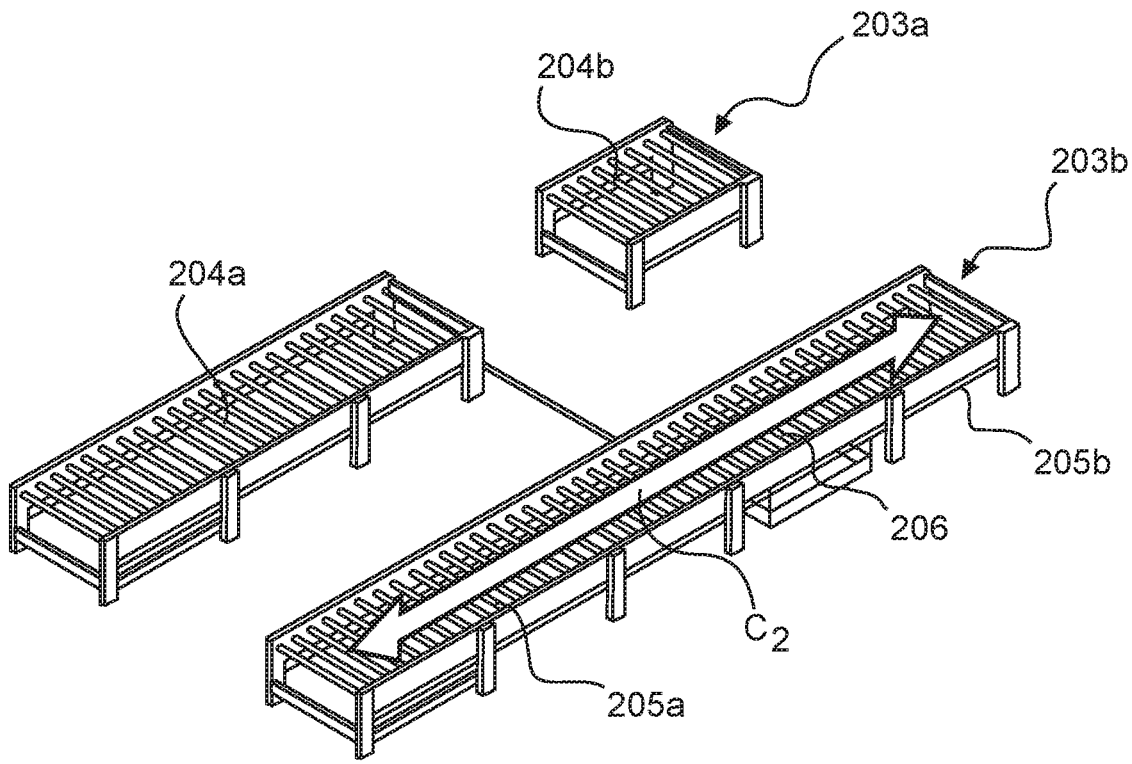

Making reference to FIGS. 7a, 7b, a conveyor arrangement comprising two conveyor tracks 203a, 203b is shown. Each conveyor track 203a, 203b comprises a plurality of rollers which are arranged in a conveyor frame 204a, 204b, 205a, 205b.

A conveyor track module 206 is adapted to fit between the conveyor track sections 204a, 204b or to fit between the conveyor track sections 205a, 205b. The conveyor track module is adapted to move in a direction perpendicular to the conveyor direction of the conveyor tracks 203a, 203b and, thus, can be moved to a position between the conveyor track sections 204a, 204b into a position between the conveyor track section 205a, 205b and vice versa. The conveyor track module 206 completes the conveyor tracks to a continuous track if it is in a position to fill the gap between the conveyor track sections 204a, 204b or 205a, 205b, respectively.

In the conveyor track module a chassis frame is supported with wheels at the frame sections of the conveyor track module. The chassis frame is oriented to move in the conveying direction of the conveyor tracks 203a, 203b. The chassis frame may be equipped with a roller conveying device and may be formed like the first of the second embodiment explained beforehand. It is understood that the mobile track section 206 and the mobile driving device positioned therein form an exchangeable mobile driving device between two track sections. If the mobile track section 206 is coupled between two conveyor track sections 204a, 204b or 205a, 205b, the mobile driving device may move along the whole track section 203a or 203b, respectively and, thus, move a pallet along this conveyor track section. The pallet may be positioned on top of the mobile track section 206 and be transported together with the mobile driving device in the mobile track section to the other conveyor track section. Hereafter, the mobile driving device may drive the pallet along the other conveyor track section.

Figure 8:
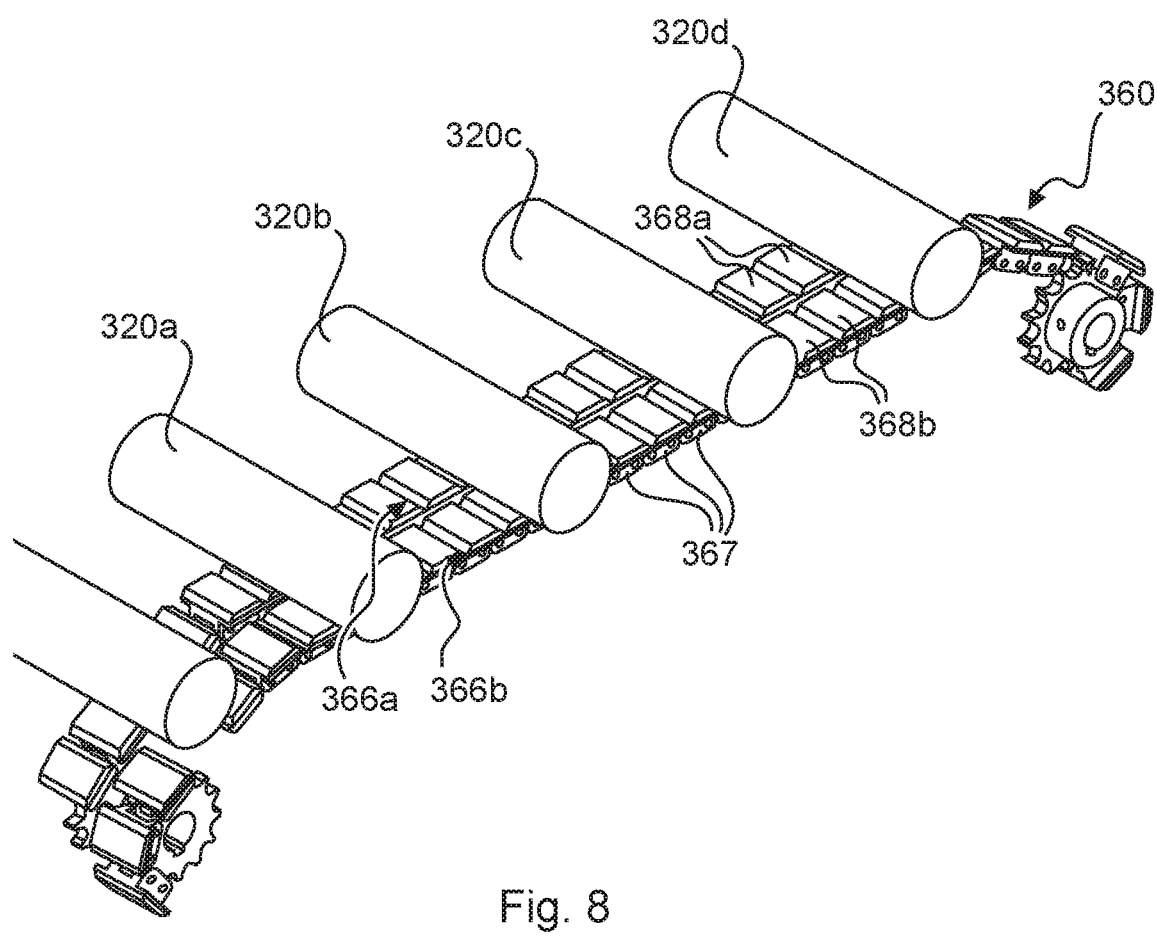
FIG. 8 shows a perspective partial view of an embodiment of a belt drive for driving rollers of a roller conveyor.

Making reference to FIG. 8, a belt drive 360 is shown in a partial view engaging for rollers 320a-d of a roller conveyor. The belt drive 360 comprises two separate endless chains 366a, 366b arranged parallel to each other and driven synchronously. Each chain 366a, 366b comprises a plurality of chain links 367. Friction pads 368a, 368b are attached to said chain links 367 on the side of the chain facing towards the rollers 320a-d. The friction pads 367a, 367b establish a frictional contact to the rollers to transfer a driving force. The friction pads 367a, 367b are releasable from the chain 366a, 366b and may be replaced if worn. As can be seen from FIG. 8, the friction pads 367a are somewhat staggered to the friction pads 367b such that a friction pad 367b is on the same drive position corresponding to a gap between two adjacent friction pads 367a. By this, a smooth and constant frictional drive transfer to the rollers is established.

Figure 9A:
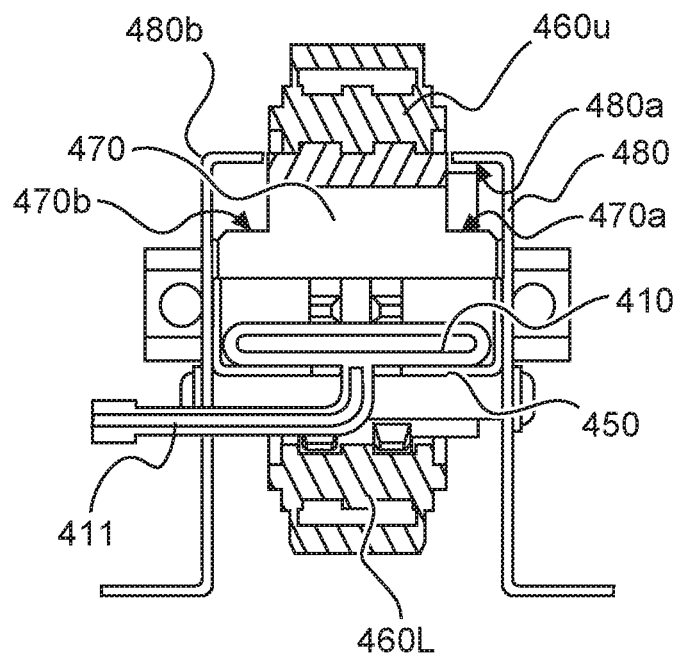
FIG. 9a shows a cross-sectional, partial view of a pneumatic lifting device according one embodiment of the invention in a lowered position.
Figure 9B:
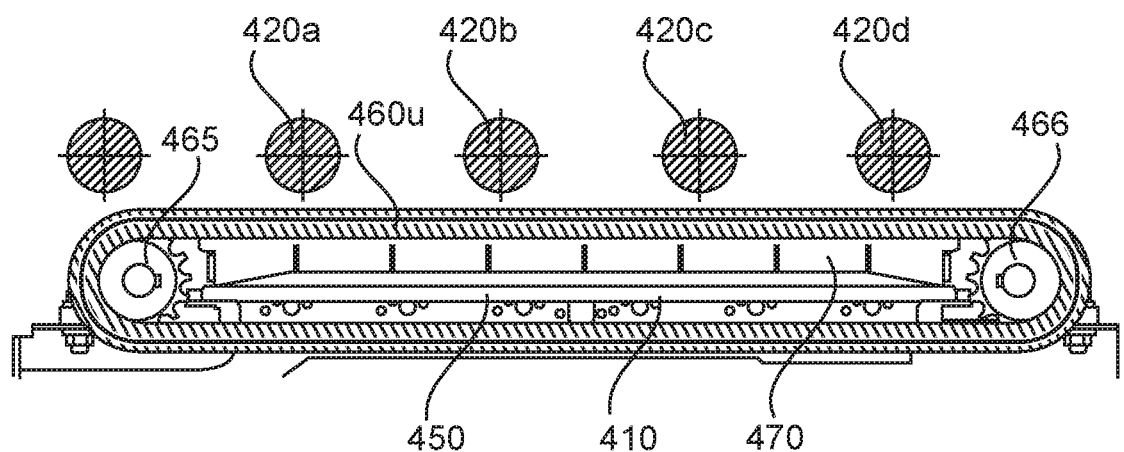
FIG. 9b shows a side sectional, partial view of a pneumatic lifting device according to FIG. 9a in a lowered position.

Making reference to FIGS. 9a, 9b, a pneumatically driven lifting device is shown. The lifting device comprise a tubular elastic hose 410 which is in fluid communication via a pressure line 11 with a source of pressurized air. A control valve like a 3/2 electrically actuated pneumatic valve may be interpositioned in said pressure line to control pressurizing of said hose 410. The hose 410 is shown in a non-pressurized condition. In this non-pressurized condition the lifting device is lowered.

The hose 410 is supported by a stationary support rail 450. Said support rail is arranged between the upper section 460u of a drive belt and the lower section 460l of said drive belt, wherein the drive belt forms an endless drive strand. The drive belt is driven and deflected at both ends by sprocket wheels 465, 466. As can be seen, the hose 410 extends in a longitudinal direction along the whole space between the two sprockets wheels 465, 466.

A slide transfer rail 470 is positioned on top of the hose and is movable in a direction transverse to the longitudinal extension of the hose. The slide transfer rail 470 may be moved up and down to effect the raising and lowering of the lifting device if the hose is expanded by applying pressure via the pressure line to the inner volume of the hose. The slide transfer rail comprises an upper slide surface which is in contact with an upper section 460u of a chain The slide transfer rail 470 and the hose 410 are positioned inside a guide and stopper frame 480 which extends along the hose 410 and the transfer rail 470. The guide and stopper frame 480 guides the slide transfer rail for a vertical movement and limits the range of vertical movement by stops 480a, 480b abutting corresponding stopper faces 470a, 470b at the slide transfer rail. By this, the slide transfer rail is lifted to a predetermined level if the hose 410 is inflated.

Figure 10A:
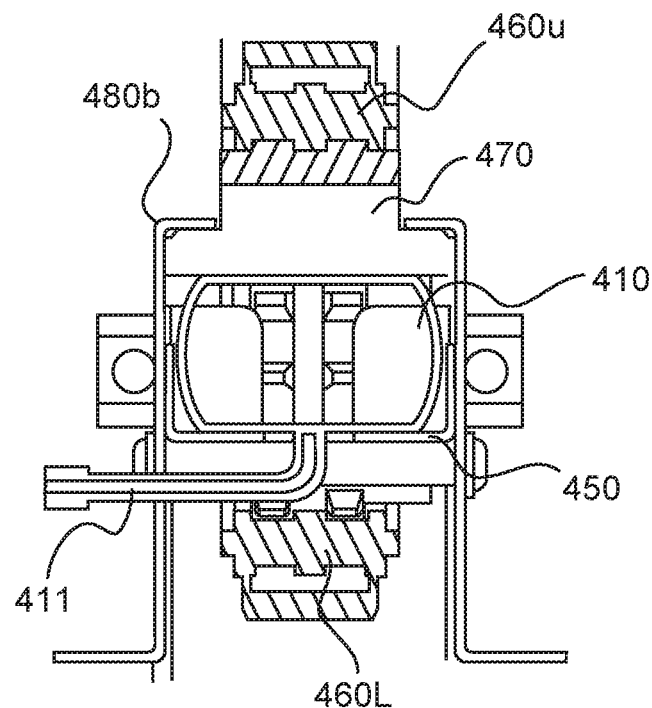
FIG. 10a shows a cross-sectional partial view of the pneumatic lifting device according to FIG. 9a in a raised position.
Figure 10B:
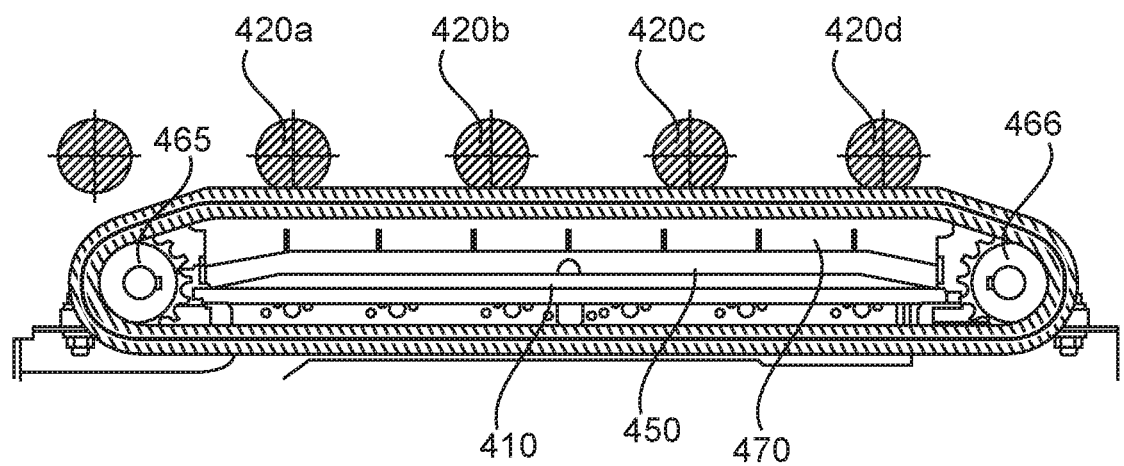
FIG. 10b shows a side sectional, partial view of a pneumatic lifting device according to FIG. 9a in a raised position.

FIGS. 10a, 10b show the arrangement of FIGS. 9a, 9b with the hose being inflated by pressurizing the inner volume of the hose via the pressure line. As can be seen, the slide transfer rail 470 is lifted to abut the stops 480a, 480b and the slide transfer rail thus raised the upper section 460u of the drive belt 460. By this, the upper frictional surface pads at the drive belt 460 are in frictional contact with the rollers 420a-d such that a driving movement of the belt 460 produces a rotational movement of the rollers 420a-d.

The invention claimed is:

1. A mobile driving device for driving a roller conveyor comprising:
   a chassis frame;
   a traction device mounted to the chassis frame wherein the traction device is adapted to move the chassis frame on a supporting surface;
   a first drive unit mechanically coupled to the traction device to transmit a driving force to the traction device for moving the chassis frame on the supporting surface;
   a roller driving device mounted to the chassis frame, wherein the roller driving device is adapted to be mechanically coupled to one or a plurality of rollers of the roller conveyor; and
   a second drive unit mechanically coupled to the roller driving device for transmitting a conveying force to the roller driving device;
   wherein the roller driving device comprises a form locking element for a form locking engagement in an interspace between two rollers of a plurality of rollers of the roller conveyor and a friction element for a friction engagement of at least one roller of the roller conveyor, wherein the form locking element and the friction element are integrally formed by a transfer element for transferring forces by frictional and form-locking engagement.

2. A mobile driving device for driving a roller conveyor comprising:
   a chassis frame;
   a traction device mounted to the chassis frame wherein the traction device is adapted to move the chassis frame on a supporting surface;
   a first drive unit mechanically coupled to the traction device to transmit a driving force to the traction device for moving the chassis frame on the supporting surface;
   a roller driving device mounted to the chassis frame, wherein the roller driving device is adapted to be mechanically coupled to one or a plurality of rollers of the roller conveyor; and
   a second drive unit mechanically coupled to the roller driving device for transmitting a conveying force to the roller driving device; and
   a control unit coupled to the first drive unit and the second drive unit, wherein the control unit is adapted to control the first and second drive unit such that:
   in a first mode the first drive unit is stopped and the second drive unit is driven; and
   in a second mode the first drive unit is driven such that the chassis frame moves along the supporting surface with a first velocity and the second drive unit is driven such that a frictional surface of the roller driving device is driven with a second velocity, the second velocity being twice as high as the first velocity.

3. The mobile driving device according to claim 2, wherein the first drive unit comprises a drive motor and a coupling arranged between the drive motor and the traction device and wherein the second drive unit comprises the drive motor and a second coupling arranged between the drive motor and the roller driving device.

4. The mobile driving device according to claim 2, wherein the first drive unit comprises a first drive motor and the second drive unit comprises a second drive motor.

5. The mobile driving device according to claim 2, wherein the traction device comprises any one or a combination of a roller arrangement, a plurality of wheels, or a crawler track.

6. The mobile driving device according to claim 2, wherein the traction device is adapted to selectively move the chassis frame along a straight line or along a curved line on the supporting surface.

7. The mobile driving device according to claim 2, further comprising a lifting device for lifting the roller driving device relative to the chassis frame.

8. The mobile driving device according to claim 2, wherein the lifting device is pneumatically-driven.

9. The mobile driving device according to claim 2, wherein the roller driving device comprises a conveyor belt and a driving device for moving the conveyor belt.

10. The mobile driving device according to claim 2, wherein the conveyor belt comprises a frictional surface facing upwards for engaging a frictional counter surface of one or a plurality of rollers of the roller conveyor device.

11. The mobile driving device according to claim 2, wherein the roller driving device comprises one or a plurality of friction wheels and the second drive unit is adapted to drive the one or the plurality of friction wheels.

12. The mobile driving device according to claim 11, wherein the roller driving device comprises a plurality of friction wheels, and wherein:
   each friction wheel comprises a frictional circumferential drive surface for engaging a frictional counter surface of the one or a plurality of rollers of the roller conveyor and each frictional wheel being rotatable about a wheel axis, the wheel axes are arranged along an endless bearing strand, and the endless bearing strand is driven by a strand drive unit and the friction wheels are driven by a wheel drive unit.

13. The mobile driving device according to claim 11, wherein the traction device comprises the endless bearing strand and the first drive unit is adapted to drive the endless bearing strand.

14. The mobile driving device according to claim 11, wherein the chassis frame is supported on the supporting surface by an undercarriage adapted for passive motion or driven motion, and the mobile driving device further comprises:
 a control unit adapted to control the mobile driving device in a first traction mode, wherein the undercarriage is maintained in a passive motion status and the endless bearing strand is driven, and in a second traction mode, wherein the endless bearing strand is maintained in a passive motion status and the undercarriage is driven.

15. The mobile driving device according to claim 11, wherein the one or the plurality of friction wheels are driven by a drive surface.

16. The mobile driving device according to claim 15, wherein the drive surface is a fixed surface or the drive surface is arranged at a drive belt and the drive belt is driven by a drive unit or is kept in a fixed position.

17. The mobile driving device according to claim 2, further comprising an energy storage device connected to the first and second drive unit.

18. The mobile driving device according to claim 2, wherein the control unit is adapted to control the first drive unit such that the first drive unit drives the chassis frame along a predetermined path on the supporting surface or to a predetermined destination on the supporting surface.

19. The mobile driving device according to claim 18, wherein the supporting surface extends along an X-axis and a Y-axis defining a coordinate system, and wherein:
 the control unit is adapted to control the first drive unit such that the chassis frame is positioned in a predetermined orientation in relation to the coordinate system on the supporting surface.

20. The mobile driving device according to claim 2, wherein the traction device is adapted to support the chassis frame on a supporting track surface formed at the roller conveyor.

21. A mobile driving device for driving a roller conveyor comprising:
 a chassis frame;
 a traction device mounted to the chassis frame, wherein the traction device is adapted to move the chassis frame on a supporting surface;
 a first drive unit mechanically coupled to the traction device to transmit a driving force to the traction device for moving the chassis frame on the supporting surface;
 a roller driving device mounted to the chassis frame, wherein the roller driving device is adapted to be mechanically coupled to one or a plurality of rollers of the roller conveyor; and
 a second drive unit mechanically coupled to the roller driving device for transmitting a conveying force to the roller driving device; and
 a control unit coupled for signal transmission to the first drive unit for driving the chassis frame, wherein the control unit is coupled for signal transmission to a sensor device arranged at the chassis frame, the sensor device being adapted to recognize an object in the environment of the chassis frame and to send a sensor signal to the control unit in case of an object being recognized, and wherein the control unit is adapted to control the drive unit such as to avoid a collision with the object.

22. The mobile driving device according to claim 21, wherein the sensor device is a camera and the control unit is adapted to process an image signal provided by the camera such as to identify an object.

23. A mobile driving device for driving a roller conveyor comprising:
 a chassis frame;
 a traction device mounted to the chassis frame wherein the traction device is adapted to move the chassis frame on a supporting surface;
 a first drive unit mechanically coupled to the traction device to transmit a driving force to the traction device for moving the chassis frame on the supporting surface;
 a roller driving device mounted to the chassis frame, wherein the roller driving device is adapted to be mechanically coupled to one or a plurality of rollers of the roller conveyor; and
 a second drive unit mechanically coupled to the roller driving device for transmitting a conveying force to the roller driving device; and
 a conveyor track section having a supporting track surface and a conveyor track section traction device, wherein the conveyor track section is adapted to couple to a first conveyor track in a first position of the conveyor track section, to move to a second position by driving the conveyor track section traction device, and to couple to a second conveyor track in a second position of the conveyor track section, and wherein the conveyor track section traction device is adapted to move the conveyor track section in a direction orthogonal to a conveying direction of the first or second conveyor tracks.

24. A method of conveying goods on a roller conveyor, comprising the steps of:
 driving a chassis frame to the roller conveyor by a traction device arranged at the chassis frame;
 coupling a roller driving device arranged at the chassis frame to the roller conveyor; and
 driving rollers of the roller conveyor by a frictional engagement;
 wherein the frictional engagement is established between a friction wheel or a conveyor belt of the roller driving device.

25. The method of claim 24, wherein the friction wheel or the conveyor belt is moved in relation to the chassis frame and the chassis frame is moved in relation to the roller conveyor.

26. The method of claim 24, wherein the frictional engagement is established by lifting the friction wheel or the conveyor belt in relation to the chassis frame.

27. The method of claim 24, wherein the chassis frame is driven along the roller conveyor.

28. The method of claim 24, wherein the frictional engagement is established by a plurality of friction wheels, and wherein each of the plurality of friction wheels is rotating about a wheel axis and the wheel axes are moved along an endless path.

* * * * *